No. 625,114. Patented May 16, 1899.
J. C. MacSPADDEN.
INFLATION VALVE.
(Application filed May 16, 1898.)
(No Model.)
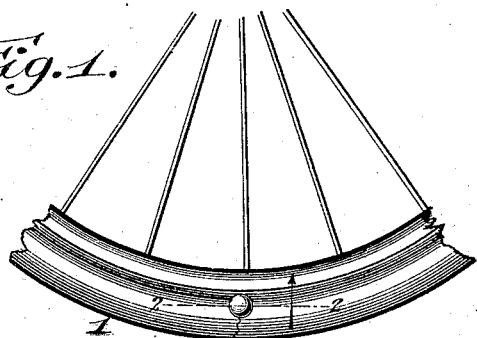
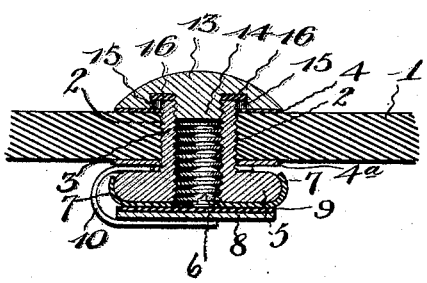
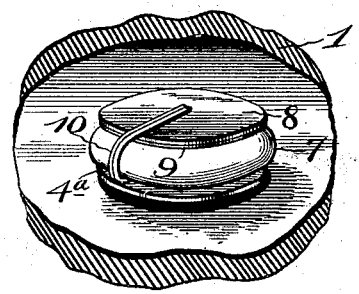
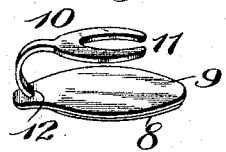
Witnesses
A. Roy Appleman
S. T. Rochaupter
John C. MacSpadden, Inventor.
By his Attorneys,
C. A. Snow & Co.

UNITED STATES PATENT OFFICE.

JOHN C. MacSPADDEN, OF ST. JOSEPH, MISSOURI.

INFLATION-VALVE.

SPECIFICATION forming part of Letters Patent No. 625,114, dated May 16, 1899.

Application filed May 16, 1898. Serial No. 680,823. (No model.)

*To all whom it may concern:*

Be it known that I, JOHN C. MACSPADDEN, a citizen of the United States, residing at St. Joseph, in the county of Buchanan and State of Missouri, have invented a new and useful Inflation-Valve, of which the following is a specification.

This invention relates to inflation-valves especially designed for use in connection with "single-tube" pneumatic bicycle-tires, but which is also applicable to other inflatable bodies, such as foot-balls, punching-bags, and the like.

The main and primary object of the invention is to provide a simple and efficient construction of inflation-valve that will occupy very little space and which may be easily applied to the tire or other inflatable body, while at the same time being so constructed as to permit free ingress of the air to the tire or other body, and also serving as a sufficient check to reduce leakage of air to a minimum after the body has been inflated.

In the adaptation of the valve to a pneumatic tire the same is especially available for use at a point outside of the plane of the rim, so as to obviate the possibility of the stem being cut off or the valve pulling out by the tire getting loose and creeping or rolling off, as is frequently the case. By placing the valve in the position referred to the necessity of weakening the rim by inserting the stem of the valve therethrough in the usual manner is also obviated, although the improvements contemplated by the present invention are equally applicable to long or short valve-stems and irrespective of the position of the stem, whether directly in the tire or other inflatable body or in the usual stem-openings provided in the rim of the bicycle-wheel.

With these and other objects in view, which will readily appear as the nature of the invention is better understood, the same consists in the novel construction, combination, and arrangement of parts hereinafter more fully described, illustrated, and claimed.

The preferred manner of applying my improvements for use is illustrated in the accompanying drawings, in which—

Figure 1 is a detail elevation of a section of a bicycle-wheel, showing the preferred position of the improved inflation-valve in the pneumatic tire outside of the plane of the rim. Fig. 2 is a cross-sectional view on the line 2 2 of Fig. 1. Fig. 3 is a detail in perspective of the inflation-valve, exposing the valve-head at the inside of the tire or other inflatable body in which it is located. Fig. 4 is a detail in perspective of the valve-plate and its spring-arm detached from the valve-head and valve-stem. Fig. 5 is a detail in perspective of a modification of the valve-plate and the spring-arm which carries the same. Fig. 6 is a detail sectional view of the construction shown in Fig. 5.

Referring to the accompanying drawings, the numeral 1 designates the rubber wall or shell of a pneumatic tire or other similar inflatable body, provided therein at a suitable point with an opening 2, in which is fitted the tubular stem 3 of the inflation-valve device contemplated by the present invention. The stem 3 is exteriorly and interiorly threaded and is preferably held in proper position within the opening 2 in the pneumatic or inflatable body 1 by means of the clamping nut or washer 4, fitted on the exterior portion of the stem and binding against the wall of the body to provide a perfectly air-tight connection or joint between the stem of the valve device and said body. At its inner end, within the pneumatic or inflatable body, the tubular valve-stem 3 is provided with a flat circular valve-head 5, having a central air-port 6 communicating with the longitudinal air-passage through the stem, and said flat circular valve-head 5, which is located within the said pneumatic inflatable body, is preferably incased in a sheathing of rubber or similar material 7, which is provided with a perforation alining with that in the valve-head and forms, in conjunction with said head, a valve-seat for the inwardly-opening valve-plate 8.

The inwardly-opening valve-plate 8 is of a circular form corresponding to the shape of the valve-head 5 and has secured to one face thereof, by means of cement or other suitable fastening means, a rubber or other impervious valve-disk 9, which is normally held in close contact with the impervious valve-seat 7 of the valve-head. The said valve-plate 8 and its impervious facing-disk 9 are preferably, though not necessarily, flat, so as to evenly contact with the valve-head and its seat, and to provide for normally holding the valve against the seat there is employed a spring-arm 10. This spring-arm may be connected with the valve-plate 8 at one end in any suitable manner and is preferably arched around the edge of the valve-head, so as to extend in the space between this head and the wall of the inflatable body. The end of the spring-arm 10 opposite its rigid connection with the valve-plate 8 is preferably forked, as at 11, so as to embrace the tubular valve-stem 3, whereby when the valve device is clamped in position by means of the clamping-nut 4 the forked end of the spring-arm 10 will be held perfectly rigid, while the other end at the opposite side of the valve-head will be free to move with the valve-plate 8 as it approaches or recedes from the valve-seat. The forked end of the spring-arm is clamped against one side of the valve-head by means of the thin interior nut or washer $4^a$, which also coöperates with the nut 4 to hold the stem in place.

The spring-arm 10, which carries the valve-plate 8, may be formed of a suitable length of spring-wire or of spring metal, as illustrated in Figs. 5 and 6 of the drawings. In the modification shown in Figs. 5 and 6 the spring-metal arm 10 is illustrated as being extended integrally from one edge of the valve-plate 8 and projects through a slit 12, formed in the rubber valve-disk 9, near one edge thereof, thereby providing for securely holding said valve-disk in place in conjunction with the cement or other fastening means therefor.

The outer end of the tubular valve-stem 3 projects beyond the outer surface of the wall of the pneumatic inflatable body and when the valve is not in use has fitted thereto the closure-cap 13. This closure-cap is preferably of the type disclosed in my Patent No. 603,510, issued May 3, 1898, and is in the form of a circular button, which is provided at its inner side with a short exteriorly-threaded stud 14, surrounded by a recess 15, in which is fitted a suitable packing-ring 16, adapted to bear against the outer edge of the valve-stem 3. The stud 14 of the cap 13 is adapted to engage the interior threads of the valve-stem 3, at the outer edge thereof, and when said cap 13 is screwed in place the inner peripheral edge thereof is preferably designed to bear against the outer surface of the exterior nut or washer 4 to insure a perfectly air-tight closure for the valve-stem and to render a leakage of air practically impossible.

While I have shown my improvements as applied to a short valve-stem in connection with a button-cap 13, still it will be understood that the valve-head, in combination with the spring-supported valve-plate 8, can be used in connection with the ordinary long valve-stem designed to be inserted in the rim of a bicycle-wheel in the usual way, and the use of the improvement in connection with a stem of this character would not change the construction of the valve proper in any particular.

Although the specific form of inflation-valve herein described can be used in connection with punching-bags, foot-balls, and like pneumatic or inflatable bodies, still it will be understood that the same are particularly useful in connection with pneumatic bicycle-tires, and when applied to the tires are preferably designed to be arranged in the position illustrated in Fig. 1, in which position the valve is located in one side of the pneumatic tire at a point between the tread of the tire and the rim of the wheel, thereby obviating the necessity of cutting the rim, while at the same time not obstructing the tread of the tire.

In the operation of the valve it will be understood that normally the spring-arm 10 presses the valve-plate 8 firmly against the adjacent valve-seat, and the pressure of the valve on the seat is largely assisted by the compressed air within the inflatable body, so the air, in conjunction with the spring-arm 10, serves to insure a firm contact between the valve and valve-seat, whereby a leakage of air outward through the valve-stem is reduced to a minimum. To provide for deflating the tire or other inflatable body, it will be readily understood that by inserting a match, stick, or other similar plunger in the stem and pressing the same inwardly against the valve 9 the latter will be moved away from the valve-seat sufficiently to permit the air to escape, and when the tire or other inflatable body is to be inflated the usual pump connection is made with the valve-stem 3, and the pressure of air from the pump will necessarily open the valve 8 and permit inflation in the usual way.

While I have set forth the preferred manner of applying my improvements for use, still it will be understood that changes in the form, proportion, and the minor details of construction may be resorted to without departing from the spirit or sacrificing any of the advantages of the invention.

Having thus described my invention, what I claim is—

1. An inflation-valve comprising a tubular stem provided at one end with a valve-seat head having an air-port therein, and a spring-arm connected at one end with the tubular stem at one side of the valve-seat head thereof, and carrying at its other end a valve disk or plate arranged at the opposite side of said valve-seat head, substantially as set forth.

2. An inflation-valve, comprising a tubular valve-stem provided at its inner end with a valve-seat head having an air-port therein, a valve-disk arranged to work against said head, and a single spring-arm arched around the edge of the valve-seat head at one side thereof, one end of said spring-arm being secured to a fixed point of attachment and having its free terminal connected with the valve-disk, substantially as set forth.

3. An inflation-valve, comprising a tubular valve-stem provided at its inner end with a head having an air-port therein, and a flat valve-seat face, a valve-plate arranged to work against the valve-seat face, and a spring connected at one end with the tubular valve-stem and having its free terminal connected with the valve-plate, substantially as set forth.

4. An inflation-valve for inflatable bodies comprising a tubular stem provided at its inner end with a valve-head having an air-port therein and whose flat surface forms a valve-seat, a valve-plate arranged to work over the valve-seat, and a spring-arm arched around the edge of the valve-head and connected at one end with the tubular stem, the other free end of the spring-arm being connected with the valve-plate, substantially as set forth.

5. An inflation-valve for inflatable bodies comprising a tubular stem provided at one end with a valve-head having an air-port therein, a valve-plate arranged to work over the valve-head and the port therein, and a spring-arm arched around the edge of the valve-head and provided with a forked end embracing the tubular stem at one side of the valve-head, the other free end of said spring-arm being connected with the valve-plate, substantially as set forth.

In testimony that I claim the foregoing as my own I have hereto affixed my signature in the presence of two witnesses.

JOHN C. MacSPADDEN.

Witnesses:
H. D. BASSETT,
JNO. C. LANDIS.